United States Patent [19]
Ishimaru et al.

[11] 3,864,340
[45] Feb. 4, 1975

[54] PROCESS FOR PRODUCING 7-ACYLAMIDO-3-CEPHEM-4-CARBOXYLIC ACIDS

[75] Inventors: Toshiyasu Ishimaru, Osaka; Yutaka Kodama, Toyama-ken, both of Japan

[73] Assignee: Toyama Chemical Co., Ltd., Tokyo, Japan

[22] Filed: Dec. 27, 1972

[21] Appl. No.: 318,714

[30] Foreign Application Priority Data
Dec. 28, 1971  Japan............................ 46–2201
Dec. 28, 1971  Japan............................ 46–2202

[52] U.S. Cl............ 260/243 C, 424/246, 260/239.1
[51] Int. Cl........................................... C07d 99/24
[58] Field of Search .................................. 260/243 C

[56] References Cited
UNITED STATES PATENTS
3,769,281   10/1973   Chauvette...................... 260/243 C Primary Examiner—Nicholas S. Rizzo
Attorney, Agent, or Firm—Oblon, Fisher, Spivak, McClelland & Maier

[57] ABSTRACT

7-acylamide-3-cephem-4-carboxylic acids are prepared in an industrially advantageous manner, by reacting a 7-amino-3-cepham-4-carboxylic acid with the reactive derivatives of a carboxylic acids in the presence of alcohols, as a solvent, and thereafter, if necessary, removing the protecting group for the amino group of the above-obtained products.

10 Claims, No Drawings

PROCESS FOR PRODUCING 7-ACYLAMIDO-3-CEPHEM-4-CARBOXYLIC ACIDS

BACKGROUND OF THE INVENTION

1. Field Of The Invention:

This invention relates to an improved process for producing 7-acylamido-3-cephem-4-carboxylic acids represented by the following formula (I):

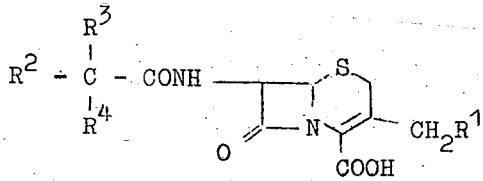

wherein $R^7$ represents hydrogen, halogen, azido, acyloxy, alkyloxy, aryloxy or S–R' group (R' represents an alkyl, aryl or heterocyclic group); $R^2$ represents hydrogen, a substituted or unsubstituted alkyl, aryl, aralkyl, cycloalkyl, cycloalkenyl or heterocyclic group; $R^3$ is the same as $R^2$ or is halogen, cyano, hydroxy, azido, or is a Y–R'''' group; (Y represents O, S, NH or COO, R'''' represents and alkyl, aryl, aralkyl or heterocyclic group); or $R^2$ and $R^3$ may jointly form a ring together; and $R^4$ represents hydrogen or amino.

2. Description Of The Prior Art:

The cephalosporin compounds of the formula (I) are known to be valuable and useful medicinals showing strong antibacterial properties against Gram-positive and Gram-negative bacteria. Cephalosporins do not show the same allergic reactions as do penicillin compounds, and therefore may be used for the treatment of human beings allergic to penicillin compounds. The Cephalosporins also show low cross-resistance with penicillin compounds. The cephalosporins are also desirable because they are characterized by a greater degree of stability under acidic conditions than penicillins.

Many attampts have been carried out in the prior art to develop a process for inexpensively preparing cephalosporins, but heretofore no completely satisfactory approach has been suggested. In one publication, cephalosporins were prepared by reacting a reactive derivative of carboxylic acids (II) with 7-amino-3-cephem-4-carboxylic acids (III) to form 7-(substituted-amino)acylamido-3-cephem-4-carboxylic acids (IV) and then removing the protecting group for the amino, when $R^5$ is a substituted amino group. That reaction may be illustrated by the following reaction schematic:

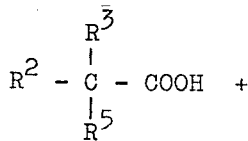

(II)

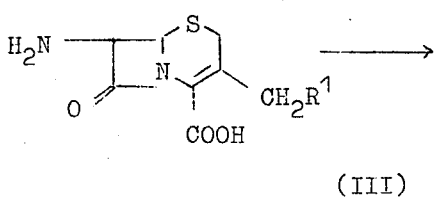

(III)

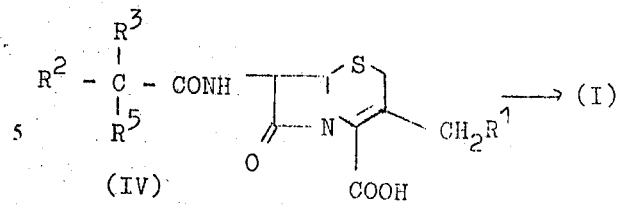

wherein $R^5$ represents hydrogen or an amino group protected in the form of a salt or an N-protected amino group, $R^1$, $R^2$ and $R^3$ are as defined above.

6-aminopenicillanic acid as the starting material of the synthetic penicillins may be dissolved in nonaqueous solvent by forming the triethylamine salt when 2 mol. times of triethylamine is added to 6-aminopenicillanic acid in the presence of nonaqueous solvent, and when the solvent is removed, the triethylamine salt of the 6-aminopenicillanic acid soluble in nonaqueous solvent is isolated. On the other hand, it is difficult to prepare the triethylamine salts of 7-amino-3-cephem-4-carboxylic acids (III) in nonaqueous solvent. For example, 7-amino-3-methyl-3-cephem-4-carboxylic acid represented by $R^7$ of the formaula (III) being a hydrogen atom is suspended in acetonitrile, and 7 to 20 mol. times of triethylamine is added thereto and the mixture is heated for long time so as to enable the 7-amino-3-methyl-3-cephem-4-carboxylic acid to be dissolved therein. However, when the solvent is removed, 7-amino-3-methyl-3-cephem-4-carboxylic acid is dissociated therefrom and the triethylamine salt thereof cannot be isolated.

It was therefore suggested (Japapese Pat. Publication No. 24714/1971 and U.S. Pat. No. 3,518,260) to dissolve the salt of the compound of the formula (III) in an aqueous solvent and then to effect reaction with a reactive derivative of the compound of the formula (III).

It has also been suggested to prepare the cephalosporins (I) by reaction of an ester of the compound of the formula (III) with a reactive derivative of the compound of the formula (II).

In the former process, however, the yield was extremely poor, as low as 23 to 40 percent, and separation and purification of the product from the unreacted starting materials is very difficult. In the latter process, even though a high yield of condensation reaction products is obtained, because the reaction may be carried out in a non-aqueous solvent, the yield of ultimate product following hydrolyzation for removal of the ester is low. This necessitates quite complicated procedures for isolation and purification.

SUMMARY OF THE INVENTION

Accordingly, it is one object of this invention to provide a technique for preparing 7-acylamido-3-cephem-4-carboxylic acid in an industrially advantageous manner, whereby a high yield of product is obtained with minimal difficulties in isolating and purifying the product.

This and other objects, as will hereinafter become more readily apparent, have been attained by the discovery that 9a) the compound of the formula (III) forms a salt in alcohols to be dissolved therein, (b) the reactive derivatives of the compounds of the formulae (II) and (III) react very advantageously in the alcohols to provide the compound of the formula (IV) in high yield and (c) no unreacted starting materials are recognized in the reaction mixture at all to have obtained pure compound of the formula (IB).

It is contrary to general chemical theories to employ for amidation reactions such as the present reaction in which carboxylic acids or reactive derivatives thereof hereinafter described are reacted with primary amines. and reactive derivatives of the carboxylic acids as in the process of the present invention, and accordingly Therefore, it is very surprizing that the reaction of the process of the present invention occurs at all in alcohol solvent to yield compounds of the formula (IV) in high yield and purity.

DETAILED DESCRIPTION OF PREFERRED EMBODIMENTS

The compound of the formula (III) used as a reactant in the process of the present invention may easily be produced by hydrolyzing the acyl group in the 7-position of the corresponding 7-acylamido-3cephem-4-carboxylic acids. Suitable compounds falling within said formula which may be used herein include: 7-amino-3-acetoxymethyl-3-cephem-4-carboxylic acid, 7-amino-3-benzoyloxymethyl-3-cephem-4-carboxylic acid, 7-amino-3-methyl-3-cephem-4-carboxylic acid, 7 amino-3-bromomethyl-3-cephem-4-carboxylic acid, 7-amino-3-methoxymethyl-3-cephem-4-carboxylic acid, 7-amino-3-ethoxymethyl-3-cephem-4-carboxylic acid, 7 -amino-3-phenoxymethyl-3-cephem-4-carboxylic acid, 7-amino-3-azidomentyl-3-cephem-4-carboxylic acid, 7-amino-3-methylthiomethyl-3-cephem-4-carboxylic acid, 7-amino-3-phenylthiomethyl-3-cephem-4-carboxylic acid, 7-amino-3-[(5-methyl-1,3,4-thiadiazol-2-yl)thiomethyl]-3-cephem-4-carboxylic acid, 7-amino-3-[(5-methyl-1,3,4-oxadiazol-2-yl)thiomethyl]-3-chephem-4-carboxylic acid, or the like.

Suitable compounds having the formula (II) which may be used herein include those compounds wherein $R^5$ is hydrogen, such as phenyl-acetic acid, $\alpha$-phenoxyacetic acid, $\alpha$-phenoxypropionic acid, $\alpha$-phenoxybutyric acid, diphenylmethoxyacetic acid, diphenylacetic acid, naphthylacetic acid, napthoxyacetic acid, thienylacetic acid, $\alpha$-chlorophenylacetic acid, $\alpha$-bromophenylacetic acid, $\alpha$-axidophenylacetic acid, mandelic acid, $\alpha$-methyl-thiophenylacetic acid, tetrazolylacetic acid, 3-phenyl-5-methyl-4isoxazolylcarboxylic acid, cyanoacetic acid, phenylmalonic acid half ester, 4-pyridylthioacetic acid, or wherein $R^5$ is amino which is protected in the salt form, or an amino protected in its N-position, such as $\alpha$-aminophenylacetic acid, $\alpha$-amino-(4-hydroxyphenyl)acetic acid, $\alpha$-amino-(3,5-dichloro-4-hydroxyphenyl)acetic acid, $\alpha$-amino-(3,5-dibromo-4-hydroxyphenyl)acetic acid, $\alpha$-amino-(3-chloro-4-hydroxyphenyl)-acetic acid, $\alpha$-amino-(4-nitrophenyl)acetic acid, $\alpha$-amino-(4-chlorophenyl)acetic acid, $\alpha$-amino-(4-methoxyphenyl)acetic acid, $\alpha$-amino-(4-methylthiophenyl)acetic acid, $\alpha$-amino-(4-acetamidophenyl)acetic acid, $\alpha$-amino-cyclohexadienylacetic acid, $\alpha$-aminocyclohexylacetic acid, $\alpha$-aminothienylacetic acid, 1-aminocyclohexylcarboxylic acid, $\alpha$-amino-4(or 5)-thiazolylacetic acid, or the like.

The protecting group of amino group may be any of the protecting groups commonly used in the art, such as, for example, substituted oxycarbonyl groups, such as t-butoxycarbonyl group, t-pentyloxycarbonyl group, $\beta$-chloroethoxycarbonyl group, $\beta$-bromoethoxycarbonyl group, $\beta$-iodoethoxycarbonyl group, $\beta,\beta$-dichloroethoxycarbonyl group, $\beta,\beta$-dibromoethoxycarbonyl group, $\beta,\beta,\beta$-trichloroethoxycarbonyl group, $\beta,\beta,\beta$-tribromoethoxycarbonyl group, 2,4-dinitrophenoxycarbonl group, benzyloxycarbonyl group which may be substituted by a halogen atom, nitro, hydroxy, alkyl or alkoxy group, benzhydryloxycarbonyl group, cyclopentyloxycarbonyl group, furfuryloxycarbonyl group, or the like; acyl groups, such as formyl group, trifluoroacetyl group, phthaloyl group, succinoyl group, or the like; aralkyl groups, such as a trityl group, bis(p-methoxyphenyl)methyl group, bis(p-methoxyphenyl)-phenylmethyl group, or the like; sulfenyl group such as o-nitrolphenylsulfenyl group, 2,4-dinitrophenylsulfenyl group, or the like; enamine moieties with aldehyde, $\beta$-diketones or $\beta$-keto-acid derivatives, such as benzaldehyde, salicylaldehyde, 3,5-dichlorosalicylaldehyde, 5-chlorosalicylaldehyde, 2-hydroxy-1-naphthylaldehyde, acetoacetic esters, acetylacetone, benzoylacetone, $\beta$-formylpropionic esters, acetoacetic acid, N-methyl-acetoacetamide, N,N-dimethylacetoacetamide, N-ethylacetoacetamide, N,N-diethylacetoacetamide, N-propylacetoacetamide, pyrrolidinocarbonylacetone, piperidino-carbonylacetone, morpholinocarbonylacetone, 1,4-bis-acetoacetylpiperazine, anilinocarbonylacetone, 2-methoxyanilinocarbonylacetone, 4-chloranilinocarbonylacetone, 2,4-dichloroanilinocarbonylacetone or the like.

The salt of the amino group include hydrochloric acid, hydrobromic acid, p-toluenesulfonic acid, or the like salts.

Suitable reactive derivatives of the carboxyl group of the compound of the formula (II), include the acid halide, acid anhydride, mixed acid anhydride with an organic or inorganic acid, active ester, acid azide, acid cyanide and active acid amide: particularly suitable is the acid halide when the amino group of the compound of the formula (II) is protected in the form of salt, mixed acid anhydride, active ester and acid anhydride whne the amino group is protected in the N-position. By the term "mixed acid anhydride" is meant to include, for example, a mixed acid anhydride with a substituted-acetic acid, alkylcarbonic acid, aralkylcarbonic acid, alkyl sulfonic acid, arylsulfonic acid, oxazolidine-2,5 dione. The term "active ester" includes for example, cyanomethyl ester, p-nitrophenyl ester, propagyl ester, N-hydroxy-succinimido ester.

Alcohols which may be used as the solvent in the condensation step of the process of this invention may be any of mono-, di- and tri- hydric alcohols, such as, for example, the lower mono-hydric alcohols, allylalcohol, ethyleneglycol, propyleneglycol, ethyleneglycolmonomethyl ether, glycerine, etc. Particularly lower alcohols having 1 to 3 carbon atoms, such as methanol, ethyleneglycol, ethyleneglycolmonomethyl ether or propyleneglycol is preferred.

According to the process of the present invention, an alcohol solution of the compound of the formula (III) is first prepared. This may be accomplished by dissolving a salt of the compound of the formaula (III) separately prepared in another system, into the alcohol. Salts such as organic amine Suitable salts include trimethylamine, triethylamine, tripropylamine, tributylamine, N-methyl-piperidine, N-ethylpiperidine, N-methylmorpholine, dimethylethylamine, pyrrolidine, piperidine, diethylamine, and the like salts and alkali salts, such as sodium potassium and the like salts. However, since the organic amine salt of the compound of the formula (III) is difficult to obtain, as hereinbefore described, the following is possibly a more preferable technique: The compound of the formula (III) is suspended in the alcohol solvent, and 2 to 7 moles of organic amine per mole of compound of the formula (III) is added thereto at room temperature to dissolve the compound of the formula (III). In this case, they may be used alcohol solvent diluted with the other solvent. It is preferred that the excessive amount of the organic amine in the solution be controlled to 0.5 to 3 mol. per mol. of the compound of the formula (III) by the addition of an acid such as a hydrohalogenic acid, acetic acid, propionic acid, p-toluensulfonic acid, or the like.

The alochol solution is then added to an organic solution or suspension of a reactive derivative of the compound of the formula (II). Alternatively, the organic solution or suspension of the reactive derivative of the compound of the formula (II) is added to the alcohol solution. Suitable organic solvents which may be used include methylene chloride, chloroform, carbon tetrachloride, ethylene chloride, trichlene (trilene), methylchloroform, acetone, tetrahydrofuran, dioxane, dimethylformamide, dimethylacetamide, or the like. It is preferred to use more than 1 mol., particularly 1 to 2 mol. of a reactive derivative of the compound of the formula (II) per mol. of the compound of the formula (III).

The reaction may be conducted at a temperature of −70° to 25°C., and preferably −50° to 0°C. for 0.5 to 20 hours, for highest yields. However, these temperatures and time periods are not necessarily limiting and the actual reaction conditions will depend upon the particular compounds of the formulae (II) and (III) selected.

If $R_5$ in the formula (IV) is a protected amino group, the protecting group may be removed by conventional methods.

The reaction to remove the protecting group may be conducted in the reaction solution per se without isolating the compound of the formula (IV), but it is preferable to isolate the compound of the formula (IV) from the reaction solution in the case that it may be separated in pure crystal form.

The protecting group for the amino can be removed by any of a variety of methods depending upon the particular types of protecting group used. For instance:

1. If the amino group is protected in the form of a salt, the reaction solution may be diluted with a slight amount of water and then neutralized to the isoelectric point of the intended product. The deposited matter is then removed by filtration, and the filtrate is directly diluted with a proper solvent or alternatively is concentrated and subsequently diluted with a proper solvent. The deposited compound of the formula (I) is then collected.

2. When the protecting group for the amino is an enamine moiety of a compound such as aldehyde, β-diketones, or keto-acid derivatives, t-butoxycarbonyl group, benhydryloxycarbonyl group, or bis(p-methoxypenyl)-methyl group, bis(p-methoxyphenyl)-phenylmethyl group, trityl group, trifluoroacetyl group, etc., removal of the protecting group can be accomplished by acidic hydrolysis.

3. When the protecting group for the amino is a mono-, di- or trihalogenoethyloxycarbonyl group, benzyloxycarbonyl group, etc., removal of the protecting group can be accomplished by chemical reduction by treatment with zinc-acetic acid, zinc-formic acid, or by catalytic reduction.

The compound of the formula (I) obtained by the techniques of this invention, is characterized by a high biological potency, and no isomerization or racemization of the structures were detected.

The use of an alcohol as a solvent, therefore, provides the capability of obtaining the compound of the formula (I) in high yields and in a high degree of purity.

The following Examples are given by way of illustration only and are not to be construed as limiting unless otherwise specified.

EXAMPLE 1

1.1 g. of sodium N-(1-N′,N′-dimethylaminocarbonyl-1-propen-2-yl)-D(-)-α-aminophenylacetate was suspended in 8 ml. of methylene chloride, and one droplet of N-methylmorpholine and 0.46 g. of ethyl chlorocarbonate were added thereto at −45°C., and the mixture was reacted at the same temperature for 90 minutes.

On the other hand, 0.75 g. of 7-amino-3-methyl-3-cephem-4-carboxylic acid was suspended in 20 ml. of methanol, and 1.45 ml. of triethylamine was added thereto to be dissolved, and 0.2 ml. of acetic acid was further added thereto. This solution was added to the solution of mixed acid anhydride prepared previously at −45°C. The temperature of the reaction mixture was raised to −15°C. over a period of 60 minutes, and the mixture was reacted at the same temperature for 1.5 hour.

Then, 2 ml. of water was added to the reaction mixture, and the mixture was adjusted to a pH of 1.5 with conc. hydrochloric acid. The insoluble matters were filtered, and the filtrate was concentrated under reduced pressure. The residue was diluted with 20 ml. of acetone, and when the deposited crystals were washed with aqueous ethanol, there was obtained 1.1 g. (86 percent) of white crystals of 7-[D(−)-α-aminophenylacetamido]-3-methyl-3-cephem-4-carboxylic acid monohydrate.

EXAMPLE 2

1.1 g. of sodium N-(1-ethoxycarbonyl-1-propen-2-yl)-D(−)-α-aminophenylacetate was suspended in 8 ml. of methylene chloride, and one droplet of N-methylmorpholine and 0.46 g. of ethyl chlorocarbonate were added thereto at −45°C., and the mixture was reacted at the same temperature for 90 minutes.

On the other hand, 0.75 g. of 7-amino-3-methyl-3-cephem-4-carboxylic acid was suspended in 20 ml. of methanol, and 1.45 ml. of triethylamine was added thereto to be dissolved, and 0.2 ml. of acetic acid was added thereto. To this solution was added the mixed acid anhydride prepared previously at −50°C. After the mixture was reacted at −20°± 5°C. for 2 hours, 2 ml. of water was added thereto, and the mixture was adjusted to a pH of 1.0 with conc. hydrolized for 1 hour. Then, the mixture was adjusted to a pH of 5.2 with triethylamine. The deposited matters were filtered off, and when the filtrate was concentrated under reduced pressure and diluted with 20 ml. of acetone, there was obtained 0.99 g. (77percent) of white crystals of 7-[D(−)-α-aminophenylacetamido]-3-methyl-3-cephem-4-carboxylic acid monohydrate.

EXAMPLE 3

1.1 g. of sodium N-(1-N′,N′-dimethylaminocarbonyl-1-propen-2-yl)-D(−)-α-aminophenylacetate was suspended in 8 ml. of methylene chloride, and one droplet of N-methylmorpholine and 0.46 g. of ethyl chlorocarbonate were added thereto at −45° to −40°C., and the mixture was reacted at the same temperature for 90 minutes.

On the other hand, 0.75 g. of 7-amino-3-methyl-3-cephem-4-carboxylic acid was suspended in 15 ml. of ethyleneglycol, and 0.97 ml. of triethylamine was added thereto to be dissolved. To the mixture was added dropwise the solution of mixed acid anhydride prepared previously at −50°C. The temperature of the reaction mixture was raised to −20°C and the mixture was reacted at the same temperature. Then, 2 ml. of water was added to the reaction mixture, and the mixture was adjusted to a pH of 1.0 with conc. hydrochloric acid and hydrolized for 30 minutes. The mixture was further adjusted to a pH of 5.2 with triethylamine, and when the mixture was diluted with 40 ml. of acetone, there was obtained 1.1 g. (86 percent) of white crystals of 7-[D(−)-α-aminophenylacetamido]-3-methyl-3-cephem-4-carboxylic acid monohydrate.

EXAMPLE 4

0.74 g. of D(−)-α-aminophenylacetyl chloride hydrochloride was suspended in 10 ml. of methylene chloride. On the othner hand, 7-amino-3-methyl-3-cephem-4-carboxylic acid was suspended in 20 ml. of methanol, and 1.46 ml. of triethylamine was added thereto to be dissolved, and 0.2 ml. of acetic acid was added thereto. Then, this solution was added dropwise to the above suspension at −50°C., and the mixture was reacted at the same temperature for 1 hour and then at −20°C. for 1 hour. The reaction mixture was adjusted at a pH of 5.2, and when the mixture was concentrated under reduced pressure and diluted with 20 ml. of acetone, there was obtained 0.85 g. (66.5 percent) of white crystals of 7-[D(−)-α-aminophenylacetamido]-3-methyl-3-cephem-4-carboxylic acid monohydrate.

EXAMPLE 5

1.1 g. of sodium N-(1-N′,N′-dimethylaminocarbonyl-1-propen-2-yl)-D(−)-α-aminophenylacetate was suspended in 8 ml. of methylene chloride, and one droplet of N-methylmorpholine and 0.46 g. of ethyl chlorocarbonate were added thereto at −45°C., and the mixture was reacted at the same temperature for 90 minutes.

On the other hand, 0.95 g. of 7-amino-3-acetoxymethyl-3-cephem-4-carboxylic acid was suspended in 20 ml. of methanol, and 1.45 ml. of triethylamine was added thereto to be dissolved, and 0.2 ml. of acetic acid was added thereto. Then, this solution was added to the solution of mixed acid anhydride prepared previously at −50° to −45°C. The mixture was reacted at the same temperature for 1 hour, and then at −30° ± 5°C. for 1 hour, and then the procedure of Example 1 was repeated under the same reaction conditions, and there was obtained 1.18 g. (80 percent) of 7-[D(−)-α-aminophenylacetamido]-3-acetoxymethyl-3-cephem-4-carboxylic acid.

EXAMPLE 6 i. 2.3 g. of sodium N-(β, β, β-trichloroethoxycarbonyl)-D(−)-60 -aminophenylacetate was suspended in 15 ml. of acetone, and one droplet of N-methylmorpholine and 0.92 g. of ethyl chlorocarbonate were added thereto, and the mixture was reacted at −45° to −40°C. for 1.5 hour.

On the other hand, 1.5 g. of 7-amino-3-methyl-3-cephem-4-carboxylic acid was suspended in 40 ml. of methanol, and 2.94 ml. of triethylamine was added thereto to be dissolved, and 0.2 ml. of acetic acid was added thereto. Then, this solution was added to the solution of mixed acid anhydride prepared previously at −50°C. The mixture was reacted at the same temperature for 1 hour, and then at −20°± 5°C. for 2 hours. Water was added to the reaction mixture so as to adjust the mixture to a pH of 4. The insoluble matters were removed therefrom, and the mixture was adjusted to a pH of 2 with hydrochloric acid and there was obained 3 g. (85 percent) of 7-[N-(β, β, β-trichloroethoxycarbonyl)-D(−)-β-aminophenylacetamido]-3-methyl-3-cephem-4carboxylic acid having a melting point of 161° to 168°C. (decomposition).

ii. 194 g. of zinc was added to 1.94 g. of 7-[N-(β, β, β-trichloroethoxycarbonyl)-D(−)-α-aminophenyl-acetamido]-3-methyl-3-cephem-4-carboxylic acid in 130 ml. of 90 percent-formic acid at 0°C., and the mixture was reacted for 1 hour. The excessive zinc was filtered off, and the filtrate was concentrated under reduced pressure. After zinc was removed therefrom with hydrogen sulfide, acetonitrile was added to the filtrate, and the mixture was adjusted to a pH of 9 with triethylamine, and then a slight amount of insoluble matters were filtered off, and the filtrate was adjusted to a pH of 5.2, and there was then obtained 880 mg. (65 percent) of 7-[D(−)-α-aminophenyl-acetamido]-3methyl-3-cephem-4carboxylic acid monohydrate.

EXAMPLE 7

1.3 g. of sodium N-(1-morpholinocarbonyl-1-propen-2-yl)-D(−)-α-amino-1,4-hexadienylacetate was suspended in 8 ml. of methylene chloride, and one droplet of N-methylmorpholine and 0.46 g. of ethyl chlorocarbonate were added thereto at −30°C., and the mixture was reacted at −45°C. for 90 minutes.

On the other hand, 0.75 g. of 7-amino-3-methyl-3-cephem-4-carboxylic acid was suspended in 20 ml. of methanol, and 1.46 ml. of triethylamine was added thereto to be dissolved, and 0.3 ml. of acetic acid was added thereto. Then, this solution was added to the solution of mixed acid anhydride prepared previously at −20°C., and the mixture was reacted at the same temperature for 3 hours, and then at −20°C. for 1 hour. To the reaction mixture was added 2 ml. of water, and the mixture was adjusted to a pH of 1.0 with conc. hydrochloric acid and hydrolized for 30 minutes. Then, the mixture was adjusted to a pH of 5.2 with triethylamine, and the deposited matters were filtered, and after the filtrate was concentrated, the residue was diluted with 20 ml. of acetone. The deposited crystals were washed with aqueous ethanol, and there was then obtained 1.2 g. (87 percent) of 7-[D(−)-α-amino-α-(1,4-cyclohexadienyl)-acetamido]-3-methyl-3-cephem-4-carboxylic acid having a melting point of 140°40 to 142°C. (decomposition).

EXAMPLE 8 i. 0.59 ml. of ethyl chlorocarbonate was added to the suspension of 1.8 g. of sodium N-(1-morpholinocarbonyl-1-propen-2yl)-D(−)-α-aminophenylacetate in 12 ml. of chloroform at −50°C., and the mixture was reacted at the same temperature for 90 minutes.

On the other hand, 0.75 g. of 7-amino-3-methyl-3-cephem-4-carboxylic acid was suspended in 20 ml. of methanol, and 1.46 ml. of triethylamine was added thereto, and 0.3 ml. of acetic acid was added thereto. To this solution was added the solution of mixed acid anhydride prepared previously at $-50°$ to $-45°C$. When the reaction mixture was raised to a temperature of $-15°C$. over a period of 30 minutes, and reacted at the same temperature for 2 hours, there were deposited crystals. The crystals were filtered to have obtained 1.9 g. (90 percent) of triethylamine salt of 7-[N-(1-morpholinocarbonyl-1-propen-2-yl)-D(−)-α-aminophenylacetamido]-3-methyl-3-cephem-4-carboxylic acid having a melting poing of 250°C. (decomposition). $IRcm_-^1:\gamma c = o$, 1760, 1665
$UV(H_2O):\lambda max.$ : 296, 266mμ ii. Then, the product thus obtained was suspended in 95 percent-aqueous ethanol, and the suspension was adjusted to a pH of 1.5 with conc. hydrochloric acid and hydrolized for 30 minutes. The reaction mixture was adjusted to a pH of 5.2 with triethylamine, and allowed to stand over night. Then, when the deposited crystals were filtered, there was obtained 1.06 g. of 7-[D(−)-α-aminophenylacetamido]-3-methyl-3-cephem-4-carboxylic acid monohydrate. And, 2 ml. of water was added to the filtrate obtained in the paragraph (i), and the filtrate was hydrolized similar to the previous manner. The residual solution was concentrated under reduced pressure, and 20 ml. of acetone was added thereto, and there was then obtained 40 mg. of 7-[D(−)-α-aminophenylacetamido]-3-methyl-3-cephem-4-carboxylic acid monohydrate. The total yield obtained in the above two procedures was 1.1 g. (86.2 percent).

EXAMPLE 9

The procedure of Example 8 was repeated under the same reaction conditions, except that sodium N-(1-pyrrolidinocarbonyl-1-propen-2-yl)-D(−)-α-aminophenylacetate was used instead of sodium N-(1-morpholinocarbonyl-1-propen-2-yl)-D(−)-α-aminophenylacetate and there was obtained 7-[D(−)-α-aminophenylacetamido]-3-methyl-3-cephem-4-carboxylic acid monohydrate having a yield of 91.5 percent.

EXAMPLE 10

The procedure of Example 8 was repeated under the same reaction conditions, except that the disodium salt of 1,4-bis{3-[D(−)-α-carboxybenzylamino]-crotonyl}-piperazine was used instead of sodium N-(1-morpholinocarbonyl-1-propen-2-yl)-D(−)-α-aminophenylacetate, and there was obtained 7-[D(−)-α-aminophenylacetamido]-3-methyl-3-cephem-4-carboxylic acid monohydrate having a yield of 78.5 percent.

EXAMPLE 11

The procedure of Example 8 was repeated under the same reaction conditions, except that sodium N-(1-piperidinocarbonyl-1-propen-2-yl)-D(−)-α-aminophenylacetate was used instead of sodium N-(1-morpholinocarbonyl-1-propen-2-yl)-D(−)-α-aminophenylacetate, and there was then obtained 7-[D(−)-α-aminophenylacetamido]-3-methyl-3-cephem-4-carboxylic acid monohydrate having a yield of 89 percent.

EXAMPLE 12

1.15 g. of sodium N-(1-morpholinocarbonyl-1-propen-2-yl)-D(−)-α-aminophenylacetate was suspended in 10 ml. of methylene chloride, and one droplet of N-methylmorpholine and 0.37 g. of ethyl chlorocarbonate were added thereto at −45°C., and the mixture was reacted at the same temperature for 90 minutes.

On the other hand, 0.75 g. of 7-amino-3-methoxymethyl-3-cephem-4-carboxylic acid was suspended in 20 ml. of methanol, and 1 g. of triethylamine was added thereto to be dissolved, and then 0.2 ml. of acetic acid was added thereto. This solution was added to the solution of mixed acid anhydride prepared previously at −45°C. Then, the mixture was raised to a temperature of −15°C. over a period of 30 to 60 minutes, and further reacted at the same temperature for 90 minutes. 2 ml. of water was added to the reaction mixture, and adjusted to a pH of 1.5 with conc. hydrochloric acid and hydrolized for 30 minutes. Then, the mixture was adjusted to a pH of 5.2 with triethylamine. The insoluble matters were filtered, and the filtrate was concentrated under reduced pressure. When the residue was diluted with acetone, there were deposited crystals. The deposited crystals were filtered, and washed with aqueous ethanol, and there was obtained 1.0 g. ( 86 percent) of crystals of 7-[D(−)-α-aminophenylacetamido]-3-methoxymethyl-3-cephem-4-carboxylic acid.

EXAMPLE 13

1.8 g. of sodium N-(1-methoxycarbonyl-1-propen-2-yl)-D(−)-α-amino-(4-hydroxyphenyl)acetate was suspended in 10 ml. of acetone, and one droplet of N-methylmorpholine was added thereto, and the mixture was cooled to −15°C. There was added 0.85 g. of ethyl chlorocarbonate thereto, and the mixture was reacted at −13° to −10°C. for 30 minutes, and then the reaction solution was cooled to −20°C.

On the other hand, 1 g. of 7-amino-3-methyl-3-cephem-4-carboxylic acid was suspended in 20 ml. of methanol, and 1.4 g. of triethylamine was added thereto to be dissolved, and 0.4 ml. of acetic acid was fruther added thereto. This solution was cooled to −20°C., and the mixed acid anhydride prepared previously was added thereto. After the mixture was reacted at −20°C. for 1 hour, the temperature of the reaction mixture was raised to 0°C. over a period of 1 hour, and the mixture was reacted for 3 hours at the same temperature.

After the reaction, 1 ml. of water was added to the reaction mixture, and the mixture was adjusted to a pH of 1.0 with conc. hydrochloric acid while being cooled, and then stirred for 30 minutes. The insoluble matters were filtered off, and the filtrate was adjusted to a pH of 5.5 with triethylamine. This solution was concentrated under reduced pressure, and the residue was diluted with 20 ml. of acetone to precipitate white crystals. The crystals were collected by filtration and washed with ethanol to obtain 1.46 g. of white crystals of 7-[D(−)-α-amino-(4-hydroxyphenyl)acetamido]-3-methyl-3-cephem-4-carboxylic acid having a decomposition point of 197°C.

EXAMPLE 14

The procedure of Example 13 was repeated under the same reaction condition, except that 2.0 g. of sodium N-(1-anilinocarbonyl-1-propen-2-yl)-D(−)-α-amino-(4-hydroxyphenyl)acetate was used instead of sodium N-(1-methoxycarbonyl-1-propen-2-yl)-D(−)-α-amino-(4-hydroxyphenyl)acetate, and there was obtained 1.35 g. of white crystals of 7-[D(−)-α-amino-(4-hydroxyphenyl)acetamido]-3-methyl-3-cephem-4-carboxylic acid having a decomposition point of 197°C.

EXAMPLE 15 i. 4.1 g. of sodium N-(β,β,β-trichloroethoxycarbonyl)-D(−)-α-amino-(4-hydroxyphenyl)acetate was suspended in 30 ml. of acetone, and one droplet of N-methyl-morpholine thereto, and the mixture was cooled to −45° to −40°C. There was added 1.2 g. of ethyl chlorocarbonate thereto, and the mixture was reacted for 1.5 hour at the same temperature.

On the other hand, 2 g. of 7-amino-3-methyl-3-cephem-4-carboxylic acid was suspended in 40 ml. of methanol, and 2.8 g. of triethylamine was added thereto to be dissolved, and then 0.8 ml. of acetic acid was added gradually thereto. This solution was cooled to −45°C, and the mixed acid solution prepared previously was added thereto. After the mixture was reacted for 2 hours at the same temperature, the temperature of the reaction mixture was raised to 0°C. over a period of 2 hours, and the mixture was reacted at 0°C. for 3 hours. The reaction solution was concentrated under reduced pressure, and water was added to the residue, and then the mixture was adjusted at a pH of 2.0 with hydrochloric acid to obtain 3.82 g. (76 percent) of white crystals of 7-[N-(β,β,β-trichloroethoxycarbonyl)-D(−)-α-amino-(4-hydroxyphenyl)acetamido]-3-methyl-3-cephem-4-carboxylic acid having a melting point of 182° to 186°C. ii. 3.82 g. of zinc was added to 3.82 g. of 7-[N-(β,β,β-trichloroethoxycarbonyl)-D(−)-α-amino-(4-hydroxyphenyl)acetamido]- 3-methyl-3-cephem-4-carboxylic acid in 150 ml. of 90 percent-formic acid at 0°C., and the mixture was reacted for 1 hour. The excess zinc was filtered off, and the filtrate was concentrated under reduced pressure. The residue was dissolved in a small amount of water, and the zinc was removed with hydrogen sulfide. The mother liquid was adjusted at a pH of 5.5 with triethylamine, and was diluted with acetone to obtain 2.4 g. of white crystals of 7-[D(−)-α-amino-(4-hydroxyphenyl)acetamido]-3-methyl-3-cephem-4-carboxylic acid having a decomposition point of 197°C.

EXAMPLE 16

3.5 g. of sodium N-(1-morpholinocarbonyl-1-propen-2-yl)-D(−)-α-aminophenylacetate was suspended in 15 ml. of methylene chloride, and one droplet of N-methylmorpholine was added thereto at −45° to −40°C., 1.2 g. of ethyl chloroformate was added dropwise to the mixture, and the mixture was reacted at the same temperature for 2 hours.

On the other hand, 2.55 g. of 7-amino-3-azidomethyl-3-cephem-4-carboxylic acid was suspended in 40 ml. of methanol, and 3 g. of triethylamine was added thereto to be dissolved, and 0.9 g. of acetic acid was further added thereto, and then the mixture was cooled to −50°C. To this solution was added the reaction mixture prepared previously, and the mixture was reacted at −35° to −30°C. for 1 hour and then at −20°C. for 4 hours. Then, 4 ml. of water was added to the reaction mixture, and the mixture was adjusted to a pH of 1.0 with hydrochloric acid. After the mixture was adjusted to a pH of 5.2 with triethylamine and insoluble matters were filtered off, and the filtrate was evaporated under reduced pressure. Acetone was added to the residue and deposited crystals were collected by filtration to obtain 4.55 g. (83.7 percent) of 7-[D(−)-α-aminophenylacetamido]-3-azidomethyl-3-cephem-4-carboxylic acid having a melting point of 240° to 250°C. (decomposition).

EXAMPLE 17

0.75 g. of 7-amino-3-methyl-3-cephem-4-carboxylic acid was suspended in 20 ml. of methanol, and 1.46 ml. of triethylamine was added thereto to be dissolved, and 0.2 ml. of acetic acid was added thereto. Then, the solution of 0.71 g. of phenoxypropionyl chloride in 8 ml. of methylene chloride was added at −50° to −45°C. to this solution, and the mixture was reacted at −40° ± 5°C. for 2 hours. Then, the temperature of the reaction mixture was raised to −10°C., and 2 ml. of water was added thereto and the mixture was adjusted to a pH of 1.0 with hydrochloric acid. The solvent was evaporated under reduced pressure, and the white crystals thus obtained were washed, and then there was obtained 1.26 g. (95.3 percent) of white crystals of 7-(α-phenoxypropionamino)-3-methyl-3-cephem-4-carboxylic acid monohydrate having a melting point of 145°C. (decomposition). IRcm : γc = o: 1770, 1675 UV($C_2H_2OH$):λmax 264, 269, 275mμ

EXAMPLE 18

0.95 g. of 7-amino-3-acetoxymethyl-3-cephem-4-carboxylic acid was suspended in 20 ml. of methanol, and triethylamine was added thereto to be dissolved, and then 0.2 ml. of acetic acid was added thereto. Then, 0.36 g. of thienylacetyl chloride in acetone was added to this solution at −45° to −40°C., and the mixture was reacted at −30° to −20°C. for 2 hours. 2 ml. of water was added to the reaction mixture, and the mixture was adjusted to a pH of 1.5, and methanol was evaporated under reduced pressure. When deposited crystals were filtered, there was obtained 1.33 g. (96.5 percent) of white crystals of 7-(thienylacetamido)-3-acetoxymethyl-3-cephem-4-carboxylic acid monohydrate.

EXAMPLE 19

1.5 g. of 7-amino-3-acetoxymethyl-3-cephem-4-carboxylic acid was suspended in 40 ml. of methanol, and 2.2 g. of triethylamine was added thereto to be dissolved, and then 0.4 ml. of acetic acid was added thereto. 0.9 g. of 1-(1-H)-tetrazolylacetyl chloride in 10 ml. of methylene chloride was added to this solution at −50° to −45°C., and the mixture was reacted at −40° ± 5°C. for 2 hours. After the reaction, the mixture was raised to a temperature of −10°C., and 4 ml. of water was added thereto, and adjusted to a pH of 1.0 with dilute hydrochloric acid, and the solvent was evaporated under reduced pressure, when the residue was washed with water, there was obtained 1.95 g. (92 percent) of 7-[1-(1-H)-tetrazolylacetoamido]-3-acetoxymethyl-3-cephem-4-carboxylic acid.

The infrared absorption spectrum of the product was identical with that of the standard sample.

EXAMPLE 20

3 g. of triethylamine was added to the suspension of 3.44 g. of 7-amino-3-[(2-methyl-1,3,4-thiadiazol-5-yl)thiomethyl]-3-cephem-4-carboxylic acid in 40 ml. of methanol to be dissolved, and the mixture was cooled to −50°C. Then, the solution of 1.6 g. of 1-(1H)-tetrazolylacetyl chloride in 8 ml. of chlorofrom, which had been cooled at −50°C., was added thereto, for 1 hour and then at −20°C. for 3 hours. The reaction mixture was evaporated under reduced pressure, and to the residue were added 10 ml. of water and 10 ml. of ethyl acetate. The water layer was collected and treated with active carbon, and adjusted to a pH of 2.0 with hydrochloric acid to obtain 3.9 g. (86 percent) of 7-{2-[1-(1H)-tetrazolylacetamido]}-3-[(2-methyl-1,3,4-thiadiazol-5-yl)-thiomethyl]-3-cephem-4-carboxylic acid. This was recrystallized from acetone to obtain white crystals having a melting point of 198° to 200°C. (decomposition).

EXAMPLE 21

3 g. of triethylamine was added to the suspension of 2.72 g. of 7-amino-3-acetoxymethyl-3-cephem-4-carboxylic acid in 30 ml. of methanol to be dissolved, and the mixture was cooled to −45°C. Then, 2.5 g. of 4-pyridylthioacetyl chloride hydrochloride in 12 ml. of chloroform was added thereto, and the mixture was reacted at −35°C. for 1 hour and then at −20°C. for 3 hours. The reaction mixture was evaporated under reduced pressure, and to the residue were added 10 ml. of water and 10 ml. of ethyl acetate. The water layer was collected and 10 ml. of ethyl acetate was added thereto, and the solution was adjusted to a pH of 2.0 to 1.8 with hydrochloric acid, and then the water layer was collected. The water layer was adjusted to a pH of 3.0 with triethylamine, and treated with active carbon, and when 200 ml. of acetone was gradually added thereto, crystals were deposited. After stirring at 0°C for 3 hours, the deposited crystals were collected by filtration to obtain 3.3 g. (80 percent) of 7-[α-(4-pyridiylthio)acetamido]-3-acetoxymethyl-3-cephem-4-carboxylic acid having a melting point of 147° to 153°C. (decomposition).

What is claimed is:

1. In a process for producing 7-acylamido-3-cephem-4-carboxylic acids represented by the formula:

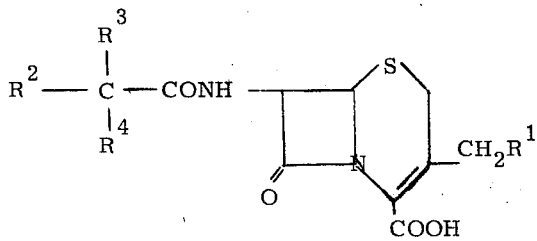

wherein $R^1$ represents hydrogen, halogen, azido, acetoxy, lower alkyloxy, phenoxy or 5-lower alkyl-1,3,4-thiadiazol-2yl thio group; $R^2$ represents hydrogen, lower alkyl, phenyl, hydroxyphenyl, thienyl, tetrazolyl or a $C_{4-7}$ cycloalkenyl group; $R^3$ represents hydrogen, phenoxy or pyridylthio group and $R^4$ represents hydrogen or amino group, the improvement which comprises:

reacting an alkali salt or a tertiary amine salt selected from the group consisting of trimethylamine, triethylamine, tripropylamine, tributylamine, N-methylpiperidine, N-ethylpiperidine, N-methylmorpholine, dimethylethylamine, pyrrolidine, piperidine and diethylamine salts of 7-amino-3-cephem-4-carboxylic acid of the formula:

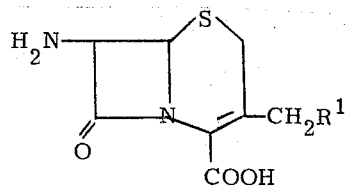

wherein $R^1$ is the same as defined above, with a reactive derivative of a carboxylic acid of the formuls:

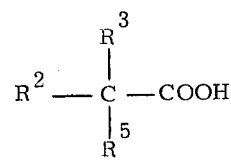

wherein $R^5$ represents hydrogen or an amino group protected in the form of a salt of hydrochloric acid, hydrobromic acid or p-toluenesulfonic acid or an N-protected amino group wherein said protecting group is lower alkoxycarbonyl, halo lower alkoxycarbonyl, nitrophenoxycarbonyl, benzyloxycarbonyl, benzhydryloxycarbonyl, cyclopentyloxycarbonyl, furfuryloxycarbonyl, formyl, trifluoroacetyl, phthaloyl, succinoyl, trityl, bis(p-methoxyphenyl)-methyl, bis (p-methoxyphenyl)-phenyl methyl, o-nitrophenylsulfenyl or 2,4-dinitrophenylsulfenyl or an enamine compound of an aldehyde, a β-diketone, a β-keto-acid ester or a β-keto acid amide and $R^2$ and $R^3$ are the same as defined above, in the presence of a $C_{1-3}$ mono-, di-, or trihydric alcohol as a solvent to produce a compound of the formula:

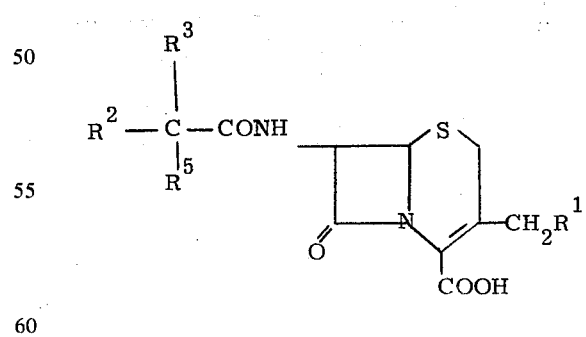

wherein $R^1$, $R^2$, $R^3$ and $R^5$ are as defined above, and then removing the protecting group of the amino group when $R^5$ represents an N-protected amino group or an amino group protected in the salt form.

2. The process of claim 1 wherein the carboxylic acid is selected from the group consisting of N-(1-N',N'-dimethylaminocarbonyl-1-propen-2-yl)-D(−)-α- aminophenylacetic acid, N-(1-methoxycarbonyl-1-propen-2-yl)-D(−)-α-amino-(4-hydroxyphenyl)acetic acid, N-(1-ethoxycarbonyl-1-propen-2-yl)-D(−)-α-aminophenylacetic acid, D(−)-α-aminoacetic acid, N,-(β,β,β-trichloroethoxycarbonyl)-D(−)-α-aminophenylacetic acid, N-(β,β,β-trichloroethoxycarbonyl)-D(−)-α-amino-(4-hydroxyphenyl)acetic acid, N-(1-morpholinocarbonyl-1-propen-2-yl)-D(−)-α-amino-1,4-hexadienylacetic acid, N-(1-morpholinocarbonyl-1-propen-2-yl)-D(−)-α-aminophenylacetic acid, N-(1-pyrrolidinocarbonyl-1-propen-2-yl)-D(−)-α-aminophenylacetic acid, 1,4-bis{3-[D(−)-α-carboxybenzylamino]crotonyl}-piperadine, N-(1-piperizinocarbonyl-1-propen-2-yl)-D(−)-α-aminophenylacetic acid, N-(1-anilinocarbonyl-propen-2-yl)-D(−)-α-amino-(4-hydroxyphenyl)-acetic acid.

3. The process of claim 1 wherein the carboxylic acid is selected from the group consisting of phenoxypropionic acid, thienylacetic acid, 1-(1-H)-tetrazolylacetic acid and 4-pyridylthioacetic acid.

4. The process of claim 1, wherein said alkali salt or tertiary amine salt of 7-amino-3-cephem-4-carboxylic acid is prepared in the presence of said alcohol by contacting the 7-amino-3-cephem-4-carboxylic acid with an alkali or tertiary amine.

5. The process of claim 1, wherein the tertiary amine salt of 7-amino-3-cephem-4-carboxylic acid is the triethylamine salt.

6. The process of claim 1 wherein $R^4$ is amino and $R^5$ represents an amino group protected in the form of a salt or an N-protected amino group.

7. The process of claim 1 wherein $R^4$ is hydrogen and $R^5$ is hydrogen.

8. The process of claim 1 wherein $R^1$ is selected from the group consisting of hydrogen, acetoxy, methoxy, azido and (5-methyl-1, 3, 4-thiadiazol-2-yl).

9. The process of claim 1, wherein said alcohol is methanol or ethyleneglycol.

10. The process of claim 1, wherein the reaction between the salt of 7-amino-3-cephem-4-carboxylic acid and the reactive derivative of said carboxylic acid is conducted at a temperature of −50°C to 0°C.

* * * * *

UNITED STATES PATENT OFFICE
CERTIFICATE OF CORRECTION

PATENT NO. : 3,864,340
DATED : February 4, 1975
INVENTOR(S) : TOSHIYASU ISHIMARU ET AL It is certified that error appears in the above-identified patent and that said Letters Patent are hereby corrected as shown below:

Page 1, under Section [30] FOREIGN APPLICATION PRIORITY DATA

"46-2201" should read --47-2201--; and

"46-2202" should read --47-2202--.

Signed and Sealed this twenty-sixth Day of August 1975

[SEAL]

Attest:

RUTH C. MASON
Attesting Officer

C. MARSHALL DANN
Commissioner of Patents and Trademarks